United States Patent [19]
David

[11] Patent Number: 5,161,670
[45] Date of Patent: Nov. 10, 1992

[54] AUXILIARY CONVEYING APPARATUS FOR ELEVATIONALLY SELECTABLE DISCHARGE

[75] Inventor: Joseph S. David, Franklin, Pa.

[73] Assignee: Joy Technologies Inc., Pittsburgh, Pa.

[21] Appl. No.: 819,160

[22] Filed: Jan. 7, 1992

[51] Int. Cl.⁵ .............................................. B65G 15/26
[52] U.S. Cl. ................................... 198/588; 198/591
[58] Field of Search ............... 198/303, 588, 591, 594, 198/607, 861.1, 861.2; 299/43–45, 64–67

[56] References Cited

U.S. PATENT DOCUMENTS

| | | |
|---|---|---|
| 898,008 | 9/1908 | Sayer . |
| 928,183 | 7/1909 | Cunningham . |
| 1,145,438 | 7/1915 | Potter . |
| 1,462,078 | 7/1923 | Williams et al. . |
| 1,672,092 | 6/1928 | Russell . |
| 1,822,930 | 9/1931 | Keller . |
| 1,875,966 | 9/1932 | Webb et al. . |
| 1,883,964 | 10/1932 | Kramer . |
| 2,063,431 | 12/1936 | Grayson et al. . |
| 2,169,424 | 8/1939 | Levin ................... 262/28 |
| 2,389,584 | 11/1945 | Acker . |
| 2,759,585 | 8/1956 | Timmons et al. ...................... 193/36 |
| 2,860,765 | 11/1958 | Bebinger ............................. 198/591 |
| 2,889,913 | 6/1959 | Boeksma et al. .................... 198/591 |
| 2,890,788 | 6/1959 | Hill .................................... 198/594 |
| 3,920,115 | 11/1975 | Craggs ............................ 198/861.2 |
| 4,031,997 | 6/1977 | Nelson ................................ 198/301 |
| 4,339,031 | 7/1982 | Densmore ........................... 198/864 |
| 4,784,257 | 11/1988 | Doerr .................................. 198/594 |
| 4,852,724 | 8/1989 | Bodimer ........................... 198/861.2 |
| 5,112,111 | 5/1992 | Addington et al. ................. 198/594 |

Primary Examiner—Joseph E. Valenza
Attorney, Agent, or Firm—Kirkpatrick & Lockhart

[57] ABSTRACT

An auxiliary conveying apparatus for receiving and conveying mined material from a bridge conveyor that is pivotally attached to the discharge end of a mobile articulated conveyor. The apparatus includes an endless belt conveyor that is disposed at an angle between the first and second stationary conveyors that intersect at right angles to one another. First and second guide rails are provided to guide the bridge conveyor at a predetermined height along the first and second stationary conveyors. Third and fourth guide rails are provided to guide the discharge end of the bridge conveyor in a curvilinear path at a second predetermined height above the endless belt conveyor. Hinged transition guides are attached to the ends of the fourth guide rail to create a ramp between the first and fourth guide rails while a fixed guide rail section creates a ramp between the first and third guide rails. A four-wheeled dolly is pivotally attached to the discharge end of the bridge conveyor and is adapted to support the discharge end thereof along the four guide rails. A two-wheeled dolly, adapted to ride on the second guide rail, is pivotally attached to the discharge end of the mobile articulated conveyor. Cam shaped members are provide on the two-wheeled dolly to raise the hinged transition rail above the two-wheeled dolly so that it may freely pass thereunder and thus remain on second guide rail.

15 Claims, 9 Drawing Sheets

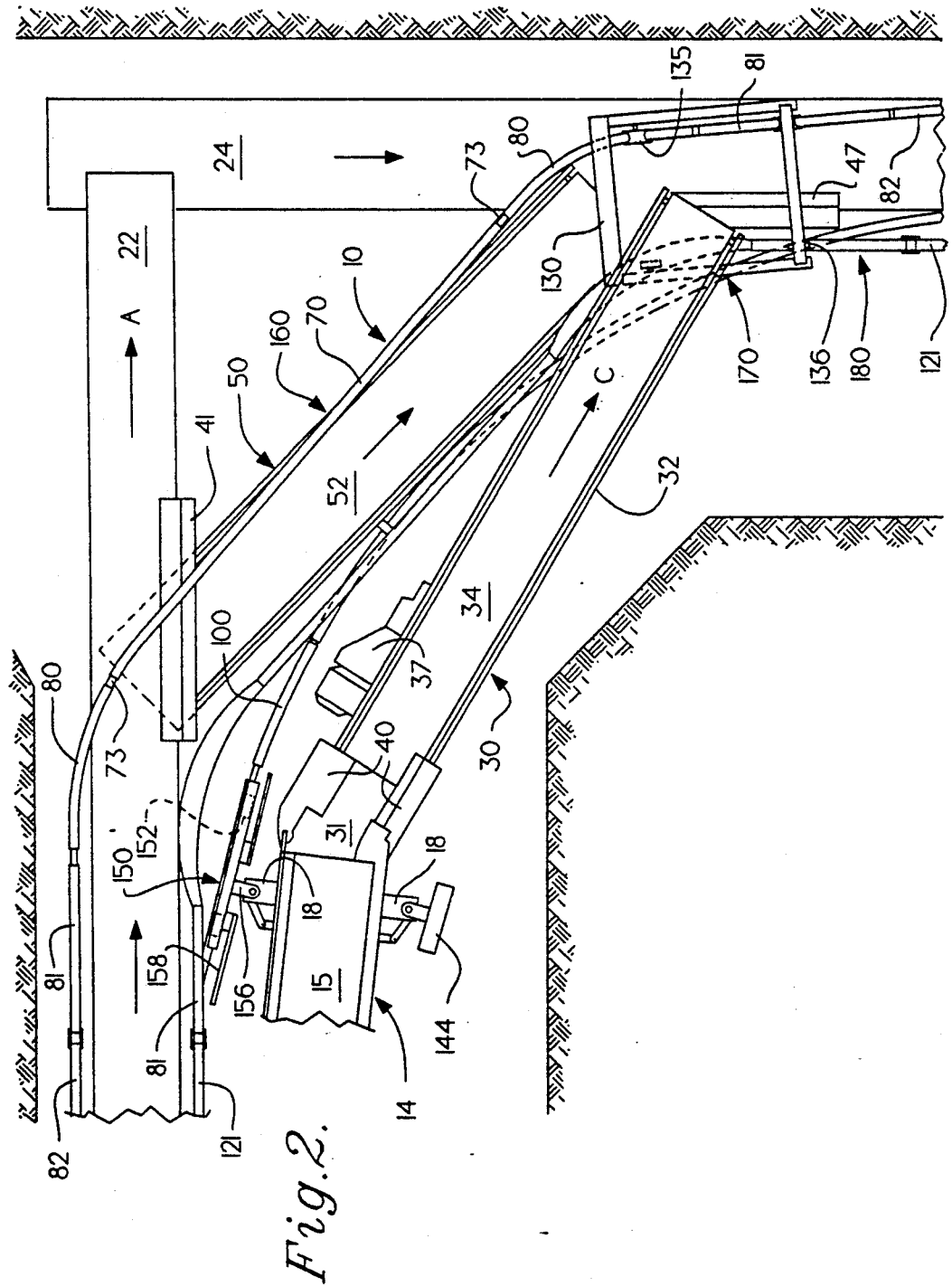

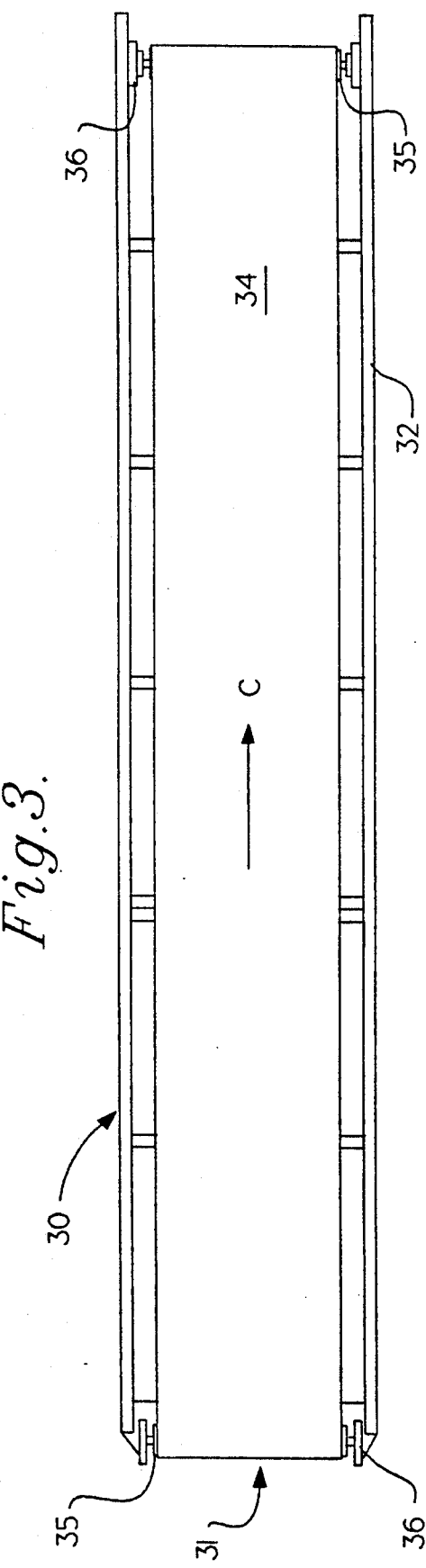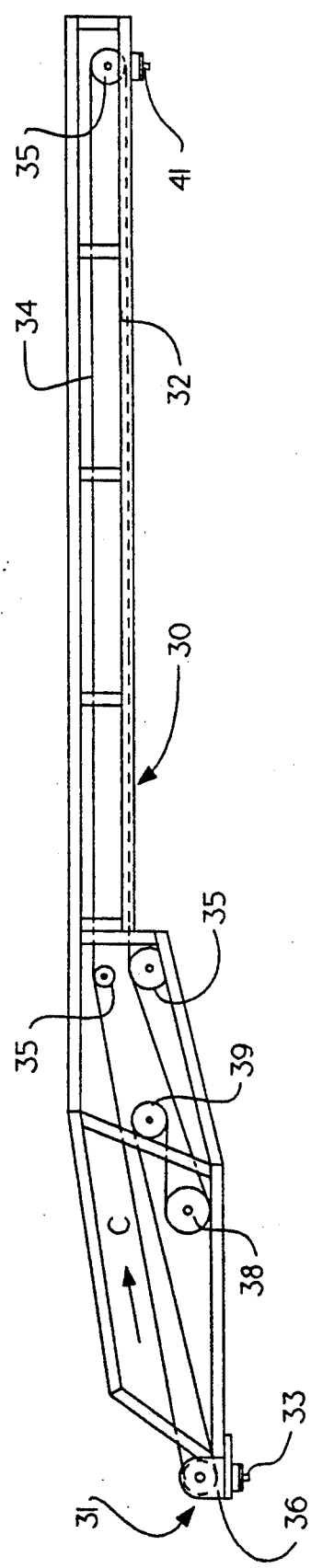

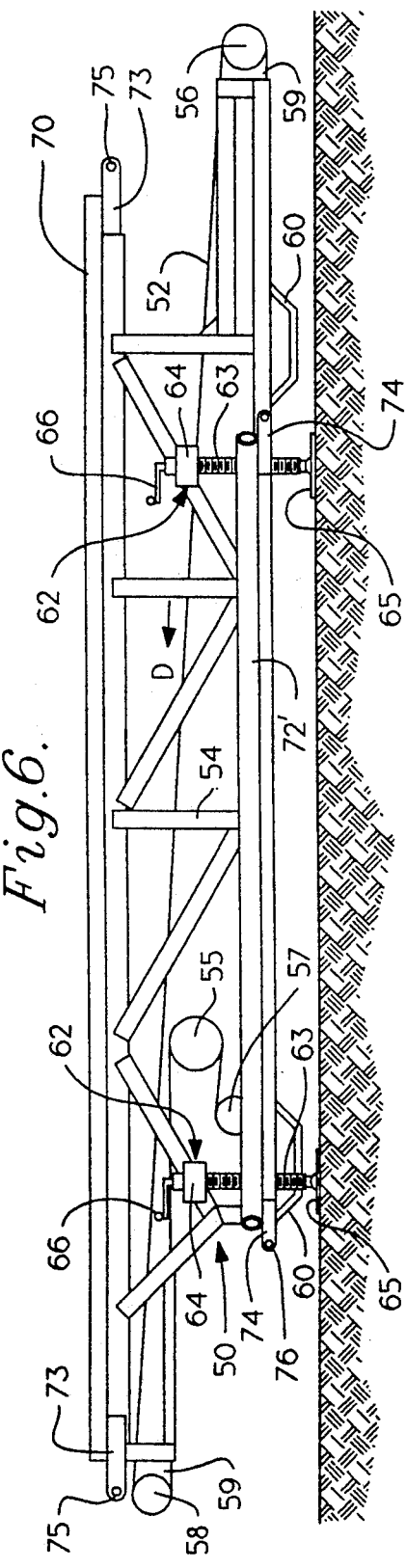
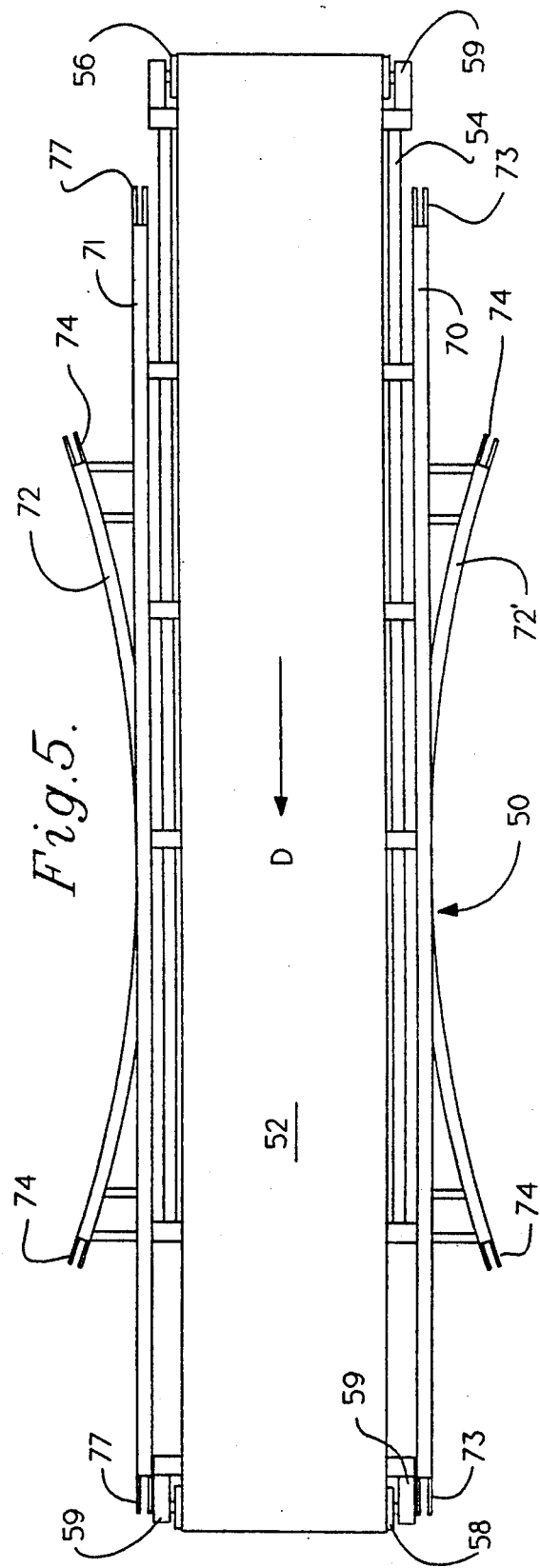
Fig.6.
Fig.5.

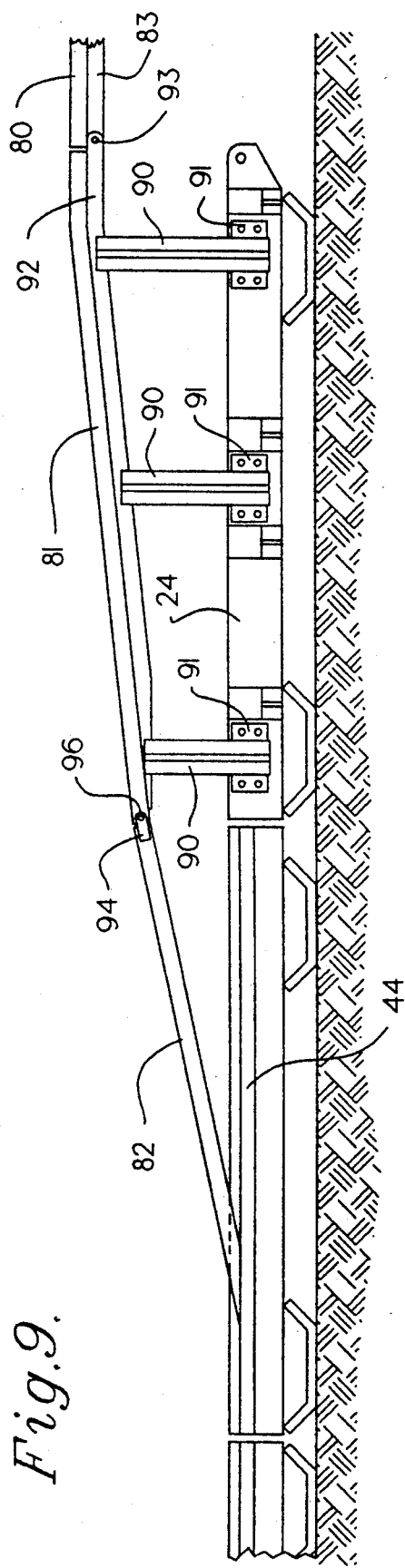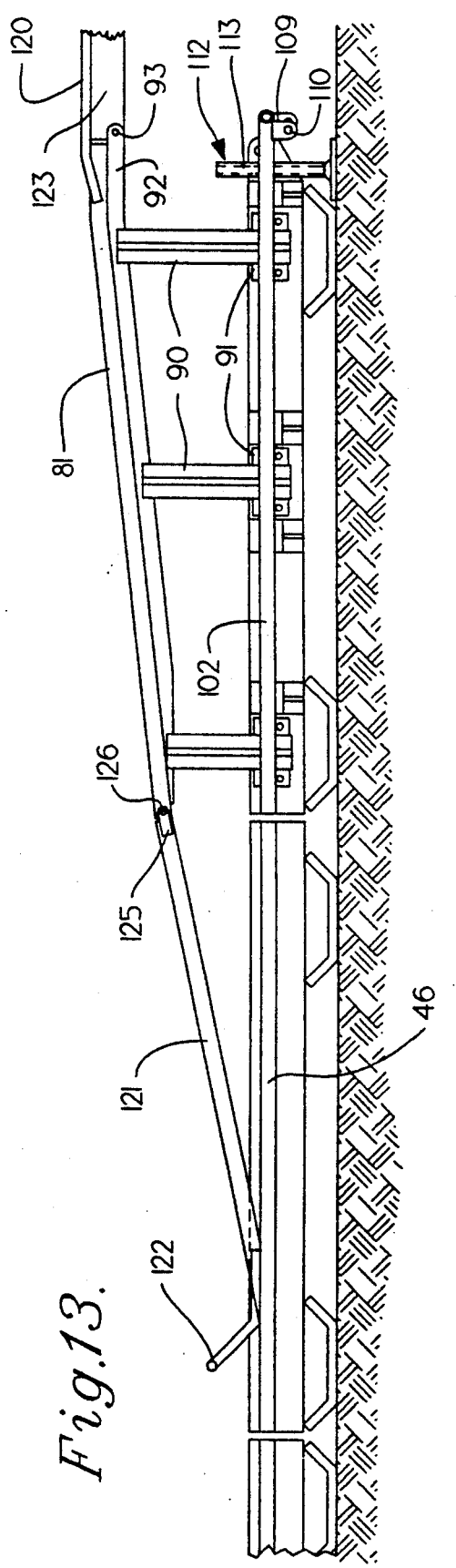

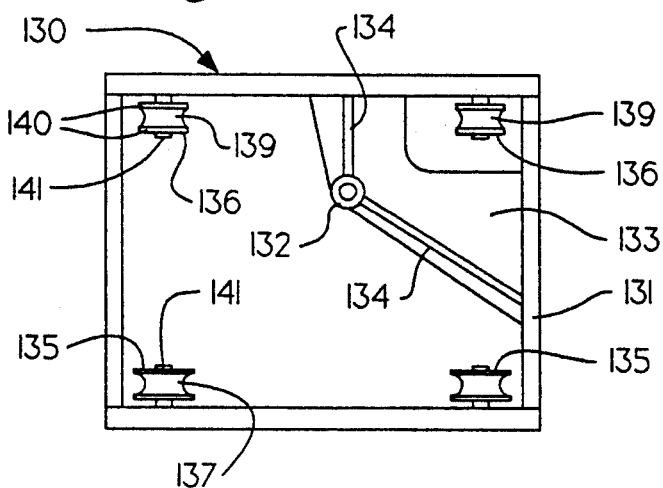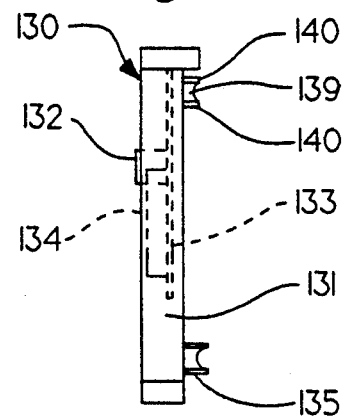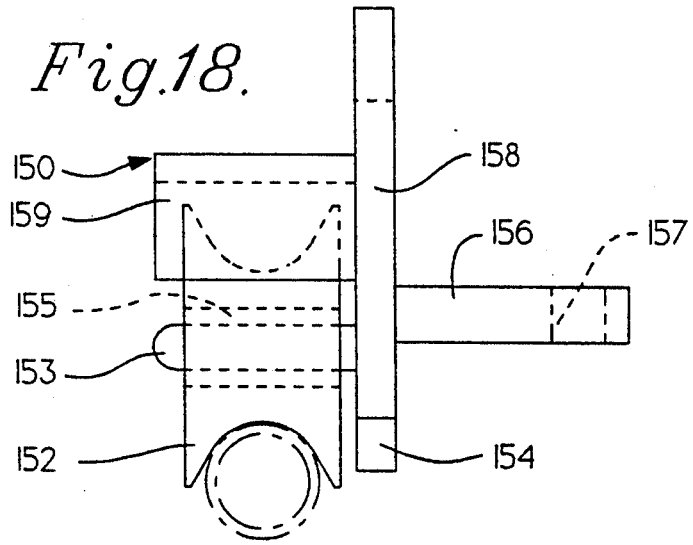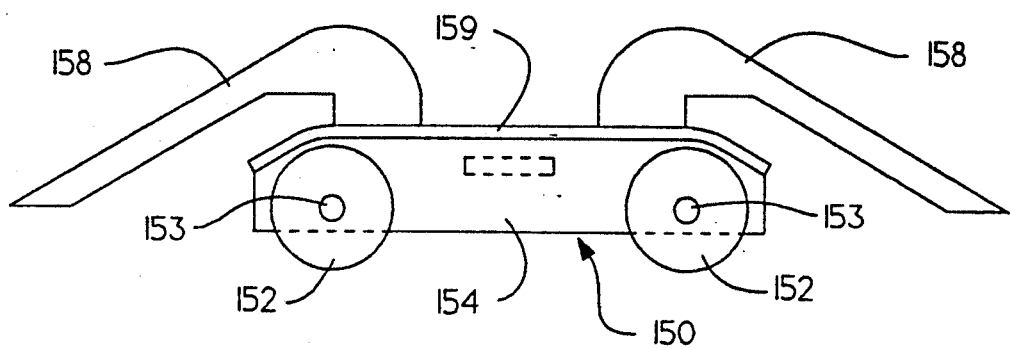

AUXILIARY CONVEYING APPARATUS FOR ELEVATIONALLY SELECTABLE DISCHARGE

BACKGROUND OF THE INVENTION

1. Field of the Invention

The present invention relates to conveying apparatus and, more particularly, is directed to conveying apparatus used in connection with mobile articulated conveyors and their attendant stationary conveyors for conveying mined materials within a mine.

2. Description of the Invention Background

In typical underground mining operations, such as in coal mining or the like, belt conveyors are generally used to transport the mined coal out of the mine. In particular, during the early stages of the mine development, main haulageways are developed within the mine to accommodate stationary main belt conveyors that are used to transfer the mined coal out of the mine or to storage areas known as bunkers. As the mine development progresses, roadways are branched off from the main haulageways to lesser roadways and finally to rooms which are generated specifically to retrieve the remaining coal. Although the mine layout and development is somewhat dictated by the configuration of the particular seam, the roadways are typically developed perpendicular to the main haulageway. As the lesser roadways are developed, separate stationary conveyors, known as panel conveyors, are installed therein to convey the mined coal to the main belt conveyor located in the main haulageway.

In a preferred practice, a mobile conveyor may be used to convey the mined ore directly from the mining machine to one of the corresponding stationary conveyors located remote from the mining machine. Mobile articulated conveyors of the types disclosed in U.S. Pat. Nos. 4,031,997 and 4,852,724 can move under self-propulsion along mine roadways and around corners while receiving the mined ore directly from the mining machine and discharging it onto the main conveyor or one of its attending panel conveyors. Mobile articulated conveyors generally employ two different methods of discharging the mined ore onto an attending stationary conveyor. More specifically, the mobile articulated conveyor may be adapted to tram onto a track mounted directly above the stationary conveyor or, in the alternative, it may be adapted to tram beside the stationary conveyor and employ a separate belt conveyor, known as a bridge conveyor, to transfer the coal from the discharge end of the mobile articulated conveyor to the stationary conveyor. A problem with the first such arrangement exists if insufficient height is available to accommodate such "stacked" apparatus.

One problem which exists with the latter discharge method is that of effecting a transition from discharging particulate material from the bridge conveyor onto the panel conveyor from a previous discharge position onto the main conveyor. Specifically, because the discharge end of the bridge conveyor rides upon guide means attached to the stationary conveyor and because the discharge end of the mobile articulated conveyor is also partially supported and guided by the stationary conveyor, a certain length of the discharge end of the articulated conveyor is constrained to remain parallel with the stationary conveyor. Therefore, the length that can be mined away from the stationary conveyor will always be shorter than the combined length of the mobile articulated conveyor and the miner itself. As such, aforementioned length of the articulated conveyor cannot be disconnected from the stationary conveyor because the mobile articulated conveyor cannot be accommodated within the length of tunnel that can be mined while being so constrained.

Further, because the mobile conveyor's discharge follows a path which is not at a 90 degree angle, but rather "cuts the corner" on a fixed radius between the main and panel conveyor belts, at the juncture between the belts, there is no means provided for receiving the bridge conveyor's discharge which does not follow a 90 degree path in the horizontal plane. Accordingly, one practice which is employed is to allow the miner to proceed in advance of the flexible conveyor and, instead, use shuttle cars to convey mined materials from an advance area sufficient to allow the length of the articulated conveyor to be accommodated. However, in that method an additional piece of expensive machinery is needed.

Thus, the need exists for an auxiliary coal conveying apparatus that can be used in connection with stationary conveyors to enable a mining machine and its attendant mobile articulated conveyor to allow continuous mine development without the need for additional mining machinery.

SUMMARY OF THE INVENTION

The preferred embodiment of the present invention, as disclosed herein, includes various unique features for facilitating the transportation of material from a mining machine and its attendant self-propelled mobile articulated conveyor to corresponding stationary conveyors located remote from the mining machine. While these unique features are particularly adapted for conveying materials within an underground mining operation, it will be understood that some of the features may be incorporated, either singularly or together, into above-ground conveying systems that employ a network of intersecting stationary conveyors.

It is, accordingly, the principal object of the present invention to provide an auxiliary conveyor system that can be used with an articulated conveyor and its attendant network of stationary conveyors in which the aforementioned problems have been overcome and which is simple and inexpensive in structure, reliable in operation and is so constructed so as to eliminate the need for separate shuttle cars and other mining equipment when developing new roadways to advance the network of stationary conveyors.

Pursuant to these and other objectives, there is provided an auxiliary coal conveying apparatus adapted to receive and convey mined material from a continuous mining machine and its attendant mobile articulated conveyor. A typical mobile articulated conveyor system employs a bridge conveyor to transfer the mined material from the mobile conveyor train to a first stationary conveyor. Guide rails are usually mounted to the first stationary conveyor to captivate and guide the bridge conveyor therealong. That first stationary conveyor is normally arranged to discharge onto a second stationary conveyor arranged perpendicularly thereto. The conveying apparatus of the present invention includes an auxiliary belt conveyor that is disposed between the two stationary conveyors at their point of intersection and is adapted to receive the mined material from the bridge conveyor and discharge it onto the downstream stationary conveyor.

The auxiliary conveyor consists of a portable framework having a driven endless belt rotatably supported thereon. A first upper guide rail is affixed to the frame of the auxiliary conveyor at a height above the guide rails located on the first and second stationary conveyors. Mounted to the respective ends of the first guide rail are transition rails that, when fastened to the outside guide rails mounted on the first and second stationary conveyors, form one continuous rail. In the preferred embodiment, transition guides having an arcuate shape are employed to create a curvilinear rail above the three intersecting stationary conveyors that substantially corresponds with the turning radius of the bridge conveyor support dolly.

A second guide rail is mounted on the opposite side of the auxiliary conveyor at a height that corresponds with the guide rails mounted to the first and second stationary conveyors. Transition guides, mounted on each end of the second guide rail, attach the second guide rail to the corresponding inside guide rails located on the first and second conveyors to create one continuous rail defining a radius path that also substantially corresponds with the normal turn radius of the discharge end of the articulated conveyor.

A third guide rail, opposite the first guide rail and substantially parallel thereto, is mounted directly above the second guide rail at the same height as the first guide rail. Mounted to each end of the third guide rail are a series of interconnected guide rails that terminate with hinged switching rails that extend downward to contact the second guide rail located directly below.

A four-wheeled dolly is pivotally connected to the discharge end of the bridge conveyor and is adapted to ride along the interconnected guide rails mounted to the three stationary conveyors. The four-wheeled dolly is adapted to symmetrically support the discharge end of the bridge conveyor and guide it along the continuous guide rails formed by the first and third guide rails and their corresponding transition guides and hinged switching rails. Similarly, the discharge end of the mobile articulated conveyor is movably attached to the inside of three stationary conveyors by a two-wheeled dolly that is adapted to run on the continuous guide rail formed by the second guide rail and its corresponding transition guides. A forward-extending cam shaped member is mounted to the two-wheeled dolly and is adapted to cooperate with actuator arms mounted on the hinged switching rails. More specifically, when encountering the hinged switching rail, the cam shaped member, in cooperation with the actuator arm, causes the hinged switching rail to be lifted above the two-wheeled dolly thereby enabling it to pass thereunder. In addition, a wheel member, adapted to run along the mine floor, is pivotally attached to the discharge end of the mobile articulated conveyor to support its opposite side.

Accordingly, the present invention provides solutions to the aforementioned problems encountered when using mobile articulated conveyors. In particular, the auxiliary conveyor system of the present invention enables the mining machine with its attendant mobile articulated conveyor to develop the roadways necessary to expand the network of stationary conveyors without the aid of a separate additional mining machine. In addition, the unique arrangement of support rails and method of selectively switching therebetween provides the bridge conveyor with a symmetrical four point support arrangement at its discharge end thereby reducing the need for a complex bridge conveyor frame.

These and other advantages of the present invention will become more apparent upon reference to the following detailed specification and drawings

BRIEF DESCRIPTION OF THE DRAWINGS

In the course of the following detailed description of the present invention, reference will be made to the following drawings in which like reference numerals are employed to designate like elements and wherein:

FIG. 2 is a plan view of the auxiliary conveying apparatus and guide rail system of the present invention;

FIG. 3 is a top view of the bridge conveyor of the present invention;

FIG. 4 is a side view of the bridge conveyor of the present invention;

FIG. 5 is a top view of the auxiliary conveyor of the present invention;

FIG. 6 is a side view of the auxiliary conveyor of the present invention;

FIG. 9 is a side elevational view of a stationary conveyor and the corresponding assembly of outside transition rails of the present invention;

FIG. 13 is a side elevational view of a stationary conveyor and the corresponding assembly of inside transition rails of the present invention;

FIG. 16 is a top view of the four-wheeled dolly of the present invention;

FIG. 17 is an end view of the four-wheeled dolly of FIG. 16;

FIG. 18 is an end view of the two-wheeled dolly of the present invention;

FIG. 19 is a side view of the two-wheeled dolly of FIG. 18;

DETAILED DESCRIPTION OF THE PREFERRED EMBODIMENT

Figure 1:
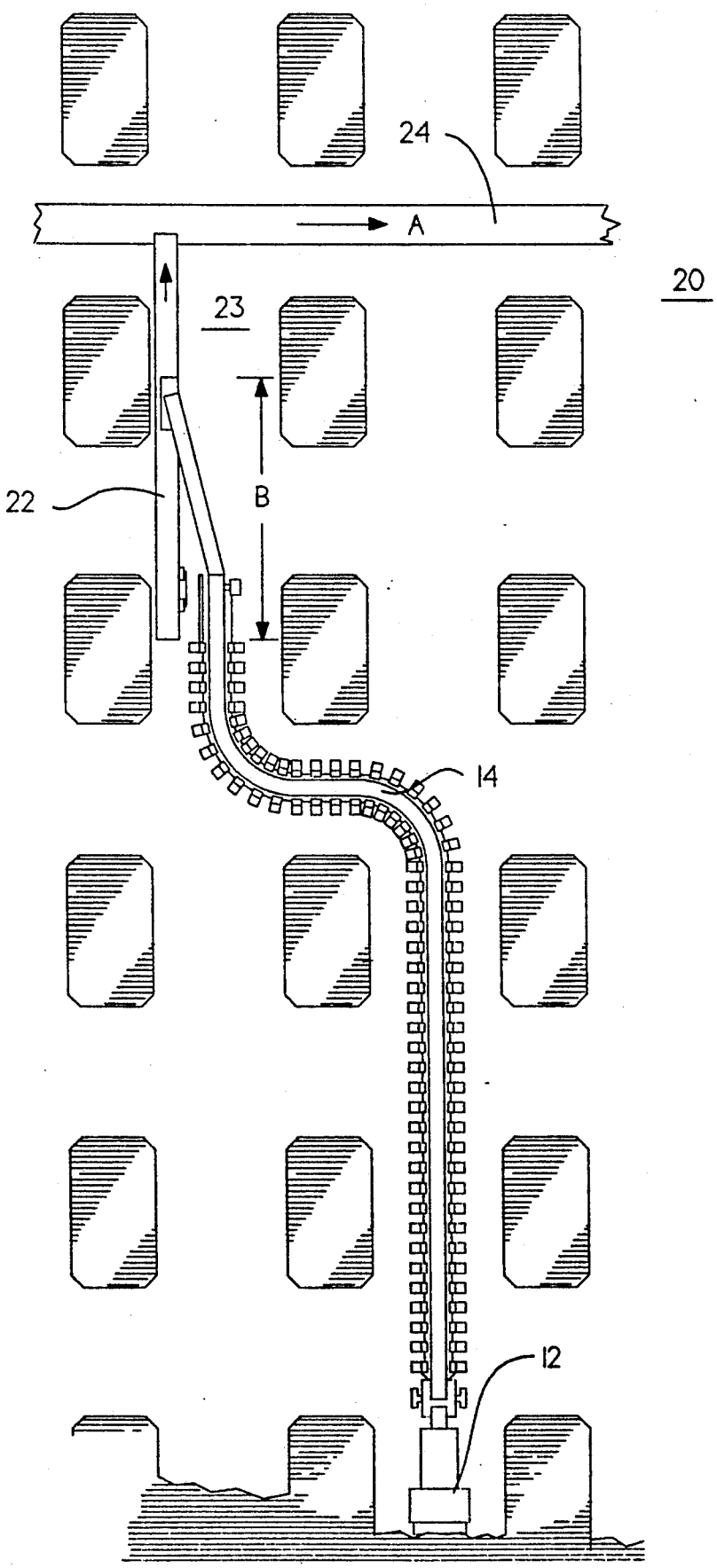
FIG. 1 is a plan view of a typical mining operation employing a mobile articulated conveyor and stationary conveyors for conveying the mined material out of the mine.

Referring now to the drawings wherein the showings are for purposes of illustrating the present preferred embodiment of the invention only and not for purposes of limiting same, the FIGURES show an auxiliary conveyor and guide rail system 10 adapted to be used in connection with a mobile articulated conveyor generally designated as 14.

More particularly and with reference to FIG. 1, there is shown a plan view of a typical underground mining operation wherein a mining machine 12 is employed to extract the ore from the mine. A mobile articulated conveyor 14 is attached to the mining machine 12 and serves to convey the mined ore to a first stationary conveyor 22 located in a roadway 23. The conveyor 22, also known as a panel conveyor, is adapted to receive the mined material from the mobile articulated conveyor 14 and discharge it into the conveyor 24, as illustrated by the arrow "A". The conveyor 24, also known as the main conveyor, extends along a main haulageway 20 and serves to transport the mined ore out of the mine.

During the development of the mine, the discharge end of the mobile articulated conveyor 14 is initially captively fastened to the main conveyor 24 and is incapable of switching to conveyor 22 when the location of the mining machine 12 so requires. Further, because of the above-described arrangement, a portion of the mobile articulated conveyor 14 (designated as "B" in FIG. 1) is forced to follow a straight line that is substantially parallel with the main conveyor 24 or the stationary conveyor 22, as the case may be, to which it is attached. Thus, while attached to main conveyor 24, the effective reach of the mobile articulated conveyor 14 is limited by a distance equivalent to the distance "B" shown in FIG. 1. As such, separate shuttle cars (not shown) must then be employed to transfer the mined ore from the mining machine 12 to the articulated conveyor 14 so that the mine development may proceed.

The instant invention is directed toward a means for providing the mining machine 12 and its attendant mobile articulated conveyor 14 with additional maneuverability to develop the clearance and roadways required to expand the network of stationary conveyors without the need of separate shuttle cars and additional mining equipment. The above mentioned problem is alleviated by the provision of the auxiliary conveyor and guide rail apparatus 10.

FIG. 2, illustrates the auxiliary conveyor and guide rail apparatus 10 of the present invention and its method of attachment, for example, to the conveyors 22 and 24. More specifically, a bridge conveyor 30 is pivotally attached to the discharge end 15 of the mobile articulated conveyor 14 and is adapted to discharge the mined ore onto one of the conveyors 22 or 24. As most specifically shown in FIGS. 3 and 4, the bridge conveyor 30 has a frame structure 32 adapted to orbitally support an endless conveyor belt 34 thereon. The endless conveyor belt 34 is supported on a series of idler rollers 35 that are operably attached to the frame structure 32 by bearing supports 36 or any known means for rotationally supporting the rollers 35. The belt 32 is driven in an orbit in the direction indicated by arrow "C" by a drive motor 37 (See FIG. 2) that is attached to a drive roll 38. In the preferred embodiment, an adjustable idler roll 39, of the type commonly used on belt conveyors, is provided to compensate for any slack that may develop in the endless belt 34.

The load end 31 of the bridge conveyor 30 has a pivot pin 33 attached thereto for pivotally attaching the bridge conveyor 30 to the discharge end 15 of the mobile articulated conveyor 14. The pivot pin 33 is adapted to be rotatably received in an upstanding socket member (not shown) that is located on the underside of the discharge end 15 of the mobile articulated conveyor 14. As such, the bridge conveyor 30 is free to pivot in a horizontal plane with respect to the discharge end 15 of the mobile articulated conveyor 14. As shown in FIG. 2, the load end 31 of the bridge conveyor 30 extends under the discharge end 15 of the mobile articulated conveyor 14 to thereby enable the mobile articulated conveyor 14 to discharge the mined material onto the belt 34. In the preferred embodiment, pieces of skirting 40 are attached to the load end 31 of the bridge conveyor 30 to direct the mined material onto the belt 34 and reduce spillage. The skirting 40 is preferably fabricated from sheet metal, however, it will be understood that other suitable material such as rubber may also be used.

Figure 7:
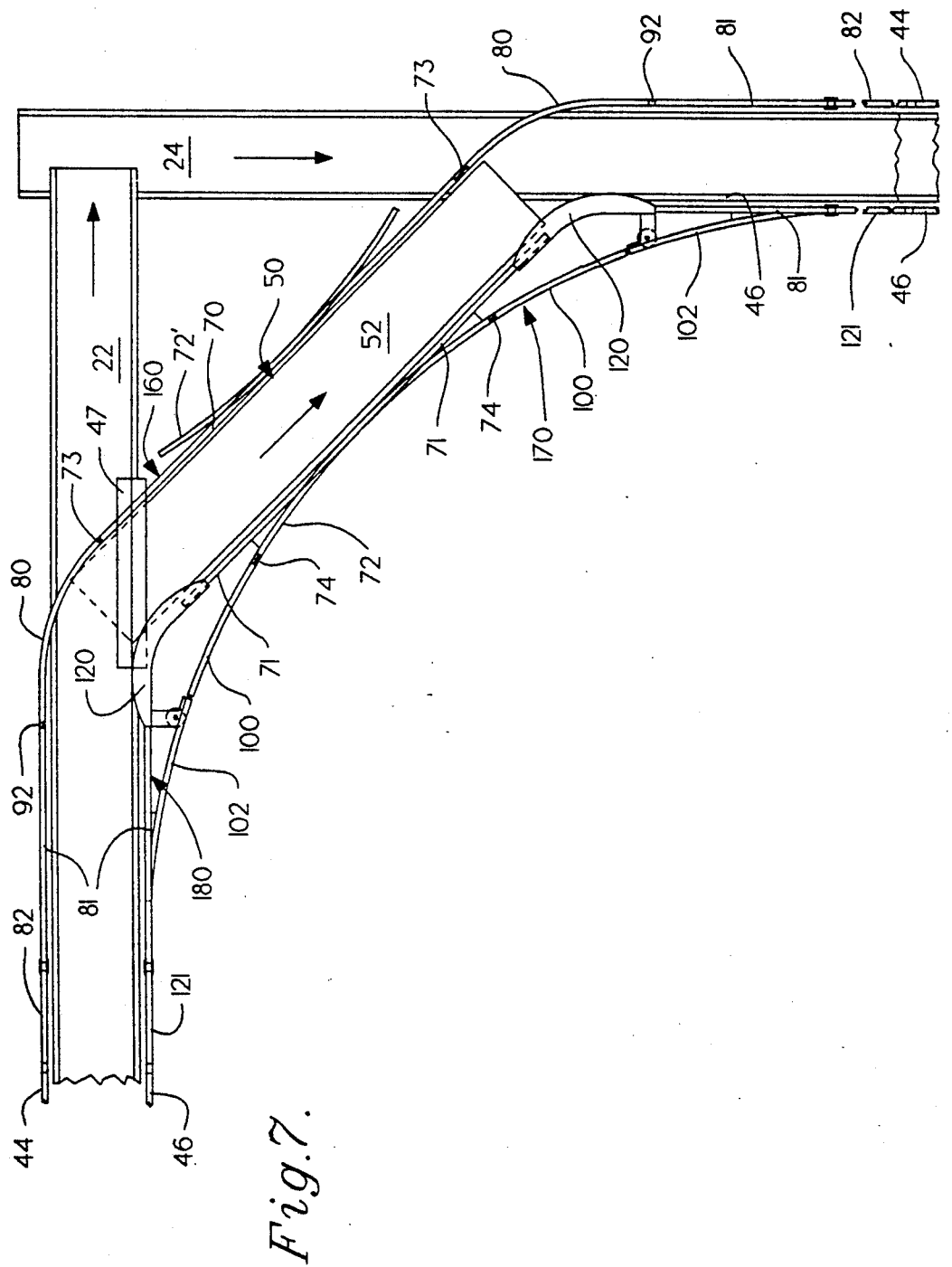
FIG. 7 is a plan view of the guide rail system of the present invention.

The auxiliary conveying apparatus 10 of the present invention includes a portable auxiliary conveyor 50 that is angularly disposed between the conveyors 22 and 24 (See FIGS. 2 and 7). As will be discussed below, the auxiliary conveyor 50 is adapted to receive the mined ore from the bridge conveyor 30 and discharge it onto conveyor 24.

Referring now to FIGS. 5 and 6, auxiliary conveyor 50 consists of an endless conveyor belt 52 that is operatively supported on a frame 54 between idler rollers 56 and 58. The idler rollers 56 and 58 are preferably rotatably supported on the frame 54 by pillow blocks 59, however, idler rollers 56 and 58 may be rotatably attached to the frame 54 by any suitable bearing means. As most specifically shown in FIG. 6, conveyor belt 52 is disposed on an angle to enable the upstream portion of the belt 52 to be positioned under the conveyor 22 while enabling the downstream portion of the belt 52 to extend over conveyor 24 for discharge thereupon. The belt 52 is driven in an orbit denoted by the arrow "D" on FIGS. 5 and 6 by a drive motor (not shown) that is attached to a drive roller 55. In the preferred embodiment, an adjustable idler roller 57, of the type commonly used on belt conveyors is provided to compensate for any slack developed in the endless belt 52. It will be understood that the drive roller 55 and the idler roller 57 are rotatably fastened to the frame 54 by any suitable bearing means (not shown).

As can be seen in FIG. 6, skid pads 60 are preferably attached to the bottom of the frame 54 to enable the auxiliary conveyor 50 to be pushed or pulled along the mine surface when being relocated. Leveling screws 62 are preferably provided on each corner of the frame 54 to enable the height of the auxiliary conveyor 50 to be adjusted after it is moved into the desired position. The leveling screws 62 preferably consist of a nut 64 and threaded rod 63 having a ball and socket leveling pad 65 attached thereto. A hand crank 66 is preferably fastened to the top of the threaded rod 63 to simplify the adjustment process. However, it will be appreciated that other forms of known mechanical and hydraulic leveling devices may be used to adjust the height of the auxiliary conveyor 50.

In the preferred embodiment, the discharge end of the bridge conveyor 30 is guided in a defined path above the conveyors 22, 50 and 24, by a series of interconnected guide rails. More specifically, as illustrated in FIG. 7, the conveyors 22 and 24 each have an outer guide rail 44 and an inner guide rail 46, typically fabricated out of hollow steel tubing, attached thereto. In the preferred embodiment, the auxiliary conveyor 50 is provided with three guide rails: 70, 71 and 72 that are adapted to correspond with the guide rails 44 and 46 to form continuous rails for guiding the bridge conveyor along the conveyors 22, 50 and 24. In particular, an outer guide rail 70 is rigidly attached to the side of the auxiliary conveyor 50 at an elevation that is above the outer guide rails 44 that are located on the conveyors 22 and 24. Similarly, a first inner guide rail 71 is mounted to the opposite side of the auxiliary conveyor 50 so that it is at the same elevation and substantially parallel to the outer guide rail 70. In addition, a second inner guide rail 72 is rigidly affixed to the auxiliary conveyor 50 and is adapted to substantially correspond with the inner guide rails 46 located on each of the conveyors 22 and 24. As can be seen in FIGS. 2 and 7, the second inner guide rail 72 has an arcuate shape; the radius of which corresponds to the normal turn radius of the articulated conveyor 14. In the preferred embodiment, an identical guide rail 72' is attached to the opposite side of the auxiliary conveyor 30 to permit the auxiliary conveyor 30 to be used, for example, on the opposite side of conveyor 22 (See FIG. 5). I prefer to construct the guide rails 70, 71, 72, and 72' out of the same type and size of tubular steel that makes up the guide rails 44 and 46. It will be appreciated, however, that guide rails 70, 71, 72, and 72' may be fabricated out of any suitable material adapted to interface with the guide rails 44 and 46 in the manner described below.

Figure 8:
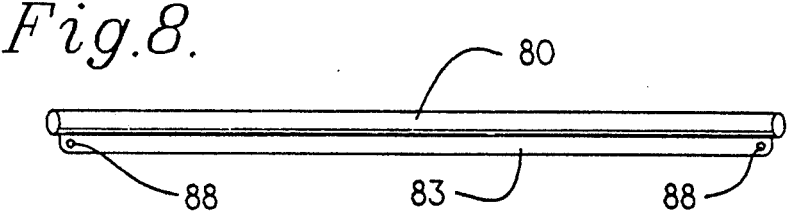
FIG. 8 is a side view of an arcuate upper transition guide of the present invention.

As further depicted in FIGS. 2 and 7, the outer guide rail 70 is united with the outer guide rails 44 on both of the conveyors 22 and 24 by three interconnected transition guides 80, 81, and 82 that are affixed in series to both ends of the guide rail 70. More specifically, a first arcuate transition guide 80 is affixed to each end of guide rail 70. As most particularly shown in FIG. 8, the transition guide 80 has downward extending rib member 83 rigidly fastened thereto to enable it to be fastened to a clevis 73 mounted on each end of the outer guide rail 70 (see FIGS. 5 and 6). In particular, the clevis 73 has an aperture 75 therethrough that substantially corresponds with apertures 88 located in the ends of the rib member 83. A bolt or pin (not shown) is inserted through the apertures 75 and 88 to fasten the transition guide 80 to the end of guide rail 70. The other end of the transition guide 80 is fastened to a second transition guide 81 that is rigidly affixed to the side of the conveyor 22 or 24, whichever the case may be.

Referring now to FIGS. 7 and 9, the transition guide 81 has a plurality of graduated vertical support members 90 rigidly attached thereto that are adapted to be fastened to the side of conveyors 22 and 24. In the preferred embodiment, bolt pads 91 are attached to the ends of the vertical support members 90 to thereby enable the transition guide 81 to be bolted to the sides of conveyors 22 and 24. A clevis 92, having an aperture 93 therethrough, extends from the one end of the transition guide 81 to receive a portion of the rib member 83 therein. More specifically, the one end of rib member 83 is inserted into the clevis 93 and a bolt or pin (not shown) is inserted through the apertures 93 and 88 to fasten the transition guides 80 and 81 together in the manner depicted in FIG. 9.

A third transition guide 82 is attached to the end of each second transition guide 81 by a hinge member 94. In particular, as shown in FIG. 9, the hinge member 94 is pivotally attached to the one end of the transition member 81 by a pin or bolt 96. In addition, the free end of the third transition guide 82 is angled to create a less obtrusive interface between the transition guide 82 and guide rail 44. It will be understood that when transition guides 80, 81, and 82, are connected together in the manner described above, they cooperate with the outer guide rails 44 to form one continuous guide rail generally designated as 160. It will also be understood that the portion of guide rail 160 that is above the auxiliary conveyor 50 is disposed at a higher elevation than the portions of the guide rail 160 that extend along the conveyors 22 and 24 in order to provide adequate clearance for the bridge conveyor 30 to traverse over the auxiliary conveyor 50.

Figure 10:
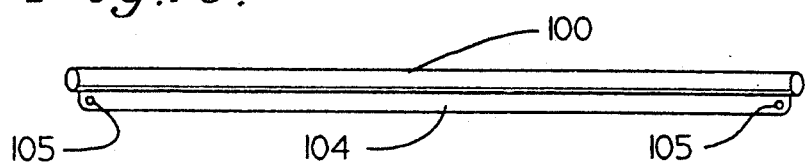
FIG. 10 is a side view of an arcuate lower transition guide of the present invention.

The guide rail system provided on the inside of the conveyors 22, 24 and 50 similarly comprises a series of interconnected guide rails 72, 100 and 102. More specifically, transition guides 100 and 102 are connected in series to each end of the arcuate guide rail 72 to ultimately connect the guide rail 72 to the guide rails 46 that are mounted to the conveyors 22 and 24. As can be seen in FIG. 10, the transition guide 100 is arcuate in shape and has a rib 104 extending along the underside thereof that is adapted to be received in a clevis 74 mounted to each end of the guide rail 72 (See FIGS. 5 and 6). Each end of the rib 104 has an aperture 105 therethrough that is adapted to correspond with an aperture 76 located in the clevis 74. A pin or bolt (not shown) is inserted through apertures 76 and 105 to connect guides 100 to the ends of guide 72.

Figure 11:
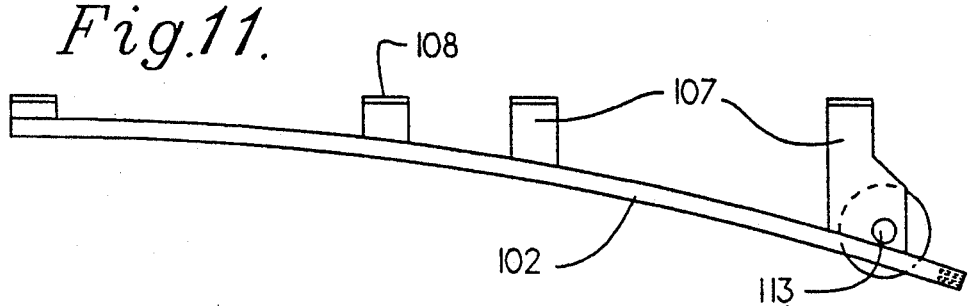
FIG. 11 is a top view of a lower arcuate transition guide with a leveling mechanism.
Figure 12:
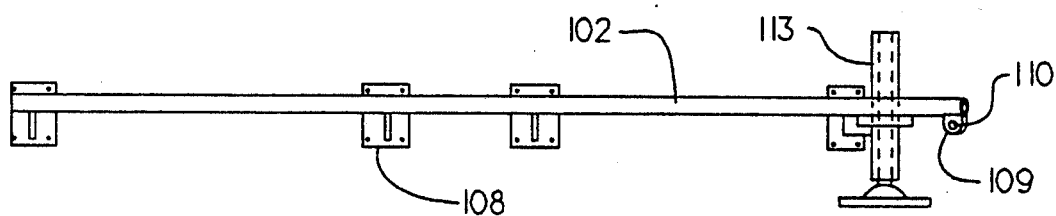
FIG. 12 is a side view of the transition guide of FIG. 11.

As can be seen in FIGS. 7, 11 and 12 the transition guide 102 is arcuate in shape and is adapted to be removably fastened to the side of conveyors 22 and 24 by a series of support members 107. In the preferred embodiment, bolt pads 108 are fastened to the ends of the support members 107 to thereby enable transition guide 102 to be bolted to the frames of conveyors 22 and 24. A clevis 109 is provided on one end of the transition guide 102 and is adapted to receive one end of the rib 104 therein. An aperture 110 is provided in the clevis 109 that substantially corresponds with the aperture 105 located in the rib member 104. The transition guide 100 is connected to the transition guide 102 by inserting a pin or bolt (not shown) through the apertures 110 and 105. As can be seen in FIG. 13, the free end of the transition guide 102 is butted against the free ends of the guide rails 46 that are mounted on the conveyors 22 and 24. In addition, a leveling jack 112 is preferably provided on the one end of transition guide 102 to provide additional support to the guide rail system. The leveling jack 112 preferably consists of a threaded rod 113 that is threaded through a support member 107. Those of ordinary skill in the art, however, will recognize that other forms of leveling devices may be used. When connected together as described above, the guide rails 46, 102, 100 and 72 create a first continuous inner guide rail generally designated as 170.

Figure 15:
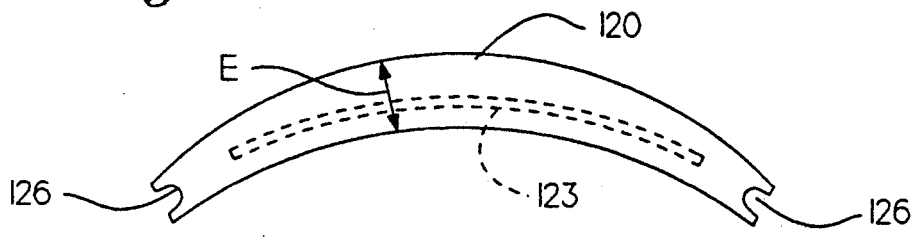
FIG. 15 is a top view of the corner guide member of FIG. 14.
Figure 14:
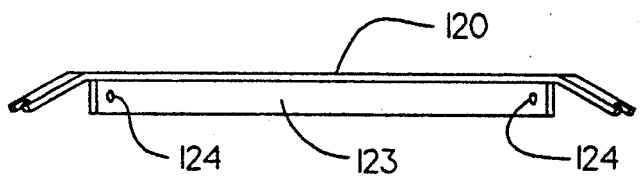
FIG. 14 is a side view of a corner guide member of the present invention.

A second series of interconnected guide rails, as illustrated in FIG. 7, are fastened in series to each end of the guide rail 71. More specifically, a corner member 120, as shown in FIGS. 14 and 15, is attached to each end of the guide rail 71 and consists of an arcuate piece of flat track that has a width "E" that is wider than the diameter of the guide rail 71. The corner members 120 are fastened to each end of the guide rail 71 by a rib member 123 that extends from the underside thereof to be received in a clevis 77 mounted on each end of the guide rail 71. An aperture 124 is provided in each end of the rib member 123 to thereby enable a pin or bolt (not shown) to be inserted therethrough to fasten the corner member 120 to the guide rail 71. In addition, as most particularly shown in FIG. 15, notches 126 are provided in the ends of the corner member 120 to receive the end of guide rail 71 therein. I have found that by angling the ends of the corner member 120 downward, as depicted in FIGS. 13 and 14, a relatively smooth transition between the corner member 120 and the guide rail 71 may be achieved. The opposite ends of the corner members 120 are fastened in a similar manner to transition guides 81 as illustrated in FIG. 13. More specifically, the opposite end of the rib member 123 is received in a clevis 92 extending from the one end of the transition guide 81. A pin or bolt (not shown) is inserted through the apertures 93 in the clevis 92 and the aperture 124 in the rib member 123 to fasten the guides 81 and 120 together.

Finally, a third transition rail 121, as shown in FIGS. 7 and 13, is pivotally attached to the end of each transition guide 81 by a hinge member 125 that is rigidly fastened to the one end of the transition rail 121. The hinge member 125 is attached to the one end of the transition guide 81 by a pin or bolt 126. In the preferred embodiment, the free end of the transition guide 121 is preferably angled to form a less obtrusive interface between the transition guide 121 and the guide rail 46 as shown in FIG. 13. It will be understood that when transition guides 120, 81 and 121 are connected together in the manner described above, they communicate with the inner guide rails 46 to form a second continuous inner guide rail generally designated as 180.

The bridge conveyor 50 is movably connected to the above described guide rails by a dolly 130 while the discharge end 15 of the articulated conveyor 14 is also movably connected thereto by a dolly 150. As can be seen in FIG. 2, a four-wheeled dolly 130 movably supports the discharge end of the bridge conveyor 30 on the continuous guide rails 160 and 180. As can further be seen in FIGS. 16 and 17, dolly 130 consists of a rectangular frame member 131 that has an upstanding socket member 132 rigidly fastened thereto. The upstanding socket member 132 is preferably attached to the frame member 131 by a flat plate 133 that is rigidly fastened to the frame member 131 as shown in FIGS. 16 and 17. Lateral support members 134 are preferably welded between the upstanding socket member 132 and the sides of the frame member 131 to provide the upstanding socket member 132 with additional lateral support. The socket member 132 is adapted to rotatably receive a pivot pin 41 (See FIG. 4) that is mounted to the underside of the bridge conveyor frame 32 to thereby pivotally connect the discharge end of the bridge conveyor 30 to the dolly 130.

The dolly 130 is guided along the continuous guide rails 160 and 180 by two pairs of track wheels 135 and 136. More specifically, two track wheels 135 are rotatably mounted in series to one side of the frame member 131. The track wheels 135 have a groove 137 therein that is adapted to receive the guide rails 70, 80, 81, 82 and 44. Similarly, a second pair of track wheels 136 are rotatably fastened to the opposite side of the frame member 131 and have a groove 139 therein that is much shallower than the groove 137 in the track wheels 135. The grooves 137 and 139 in track wheels 135 and 136, respectively, have the same root diameter so that when all four wheels 135 and 136 are traveling on the above-described collection of tubular guide rails, the dolly 130 is kept substantially level. However, track wheels 136 have a smaller outside diameter than track wheels 135 and thus have wide flat portions 140 on both sides of the central groove 139 (See FIGS. 16 and 17). As such, when wheels 136 encounter the flat corner members 120, the grooves 139 disengage the tubular guide members and, by virtue of the flat portions 140, may easily negotiate the turn. Furthermore, because the outside diameters of track wheels 136 are smaller than the outside diameters of track wheels 135, the cocking action caused by the larger diameter wheels 135 on the one side of the dolly 130 is minimized and substantial levelness of the dolly 130 is maintained. In the preferred embodiment, the wheels 135 and 136 have bearings centrally disposed therein (not shown) that are adapted to receive an axle member 141. It will be understood by those of ordinary skill in the art, however, that other types of track wheels may be adapted to this application and will vary with the type and configuration of guide rails utilized.

The dolly 130 is adapted to guide the discharge end of the bridge conveyor 30 in a path that will enable the bridge conveyor to continuously discharge the mined material onto any one of the three stationary conveyors 22, 24 and 50 depending upon the progression of the mobile articulated conveyor 14. For example, the dolly 130 is adapted to carry the discharge end of the bridge conveyor 30 along the guide rails 44 and 46 mounted to the conveyor 22. As the bridge conveyor 30 moves along the conveyor 22 in a direction towards conveyor 24, the dolly 130 will eventually encounter the hinged guide rails 121 and 82. Because the hinged guide rails are normally in the down position (See FIGS. 9 and 13) the dolly 130 will ride up those rails onto the continuous guide rails 160 and 180. As the dolly 130 encounters the arcuate transition guides 80 and 120, the track wheels 136 are free to skid on the corner guide 120 thereby enabling the dolly 130 to traverse the rather narrow curve defined by the transition guide 80 and the corner guide 120. The continuous guide rails 160 and 180 serve to direct the dolly 130 over the auxiliary conveyor 50 in a path that allows continuous discharge of material onto these conveyors. After the dolly 130 has progressed to a point where it is over the conveyor 24, it will encounter the second set of guide rails 82 and 121 which will ultimately carry it onto the guide rails 44 and 46 mounted to the conveyor 24. It will be understood that the progression of the dolly 130 along the conveyors 22, 24 and 50 is dictated by the movement of the mobile articulated conveyor 14. As such, the direction of progression described above may be reversed with the dolly 130 carrying the discharge end of the bridge 24 to the corresponding rails mounted on the conveyor 22. In the preferred embodiment, deflection skirting 47 (See FIG. 2) is employed to reduce and eliminate spillage of the mined material as the bridge conveyor traverses above the points where the auxiliary conveyor 50 intersects the conveyors 22 and 24. The deflection skirting preferably consists of sheet metal; however, other suitable material such as rubber sheeting may be used.

As can be seen in FIG. 2, a second dolly 150, adapted to travel along the continuous guide rail 170, is pivotally attached to the discharge end 15 of the mobile articulated conveyor 14. As most particularly shown in FIGS. 18 and 19, the dolly 150 consists of two guide wheels 152 that are rotatably fastened to a support member 154. More specifically, the wheels 152 are preferably rotatably attached to the support member by axles 153 that are received in bearings 155 that are centrally disposed in the wheels 152. A pivot arm 156 is rigidly attached to the rear side of the support member 154 to enable the dolly 150 to be attached to a laterally extending frame member 18 of the mobile articulated conveyor 14. An aperture 157 is provided in the pivot arm 156 to enable a pin or bolt (not shown) to be inserted therethrough into the frame member 18 order to pivotally connect the dolly 150 to the discharge end 15 of the mobile articulated conveyor 14. The dolly 150 is prevented from traveling onto the upper continuous guide rail 180 by a series of cam shaped devices mounted thereon that are adapted to selectively raise the hinged rail 121 above the wheels 152. More specifically, forward and backward extending cam members 158 are mounted to the support member 154 of the dolly 150 and are adapted to engage actuator arms 122 that are mounted to the hinged rails 121 (see FIGS. 13 and 20). A second cam member 159 is mounted directly above the wheels 52 and is also adapted to engage the hinged rail 121.

Figure 20:
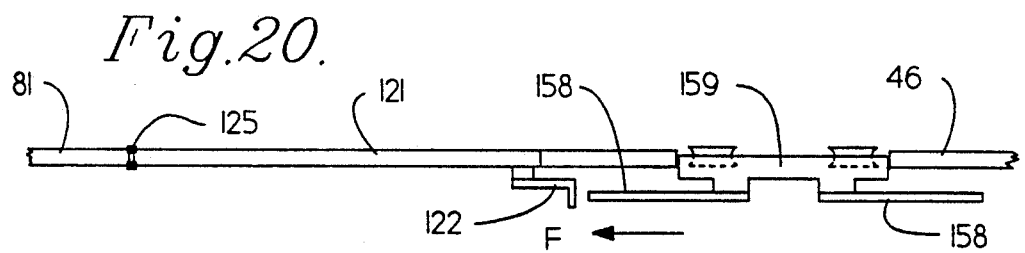
FIG. 20 is a top view of the two-wheeled dolly of the present invention as it approaches the hinged upper switching rail of the present invention.
Figure 21:
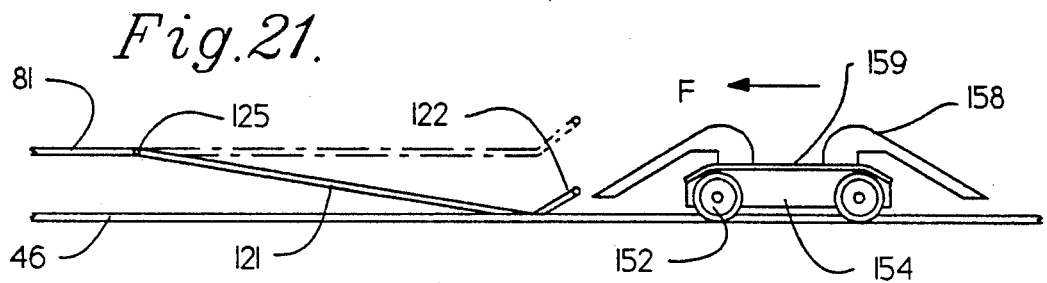
FIG. 21 is a side view of the two-wheeled dolly as depicted in FIG. 20.
Figure 22:
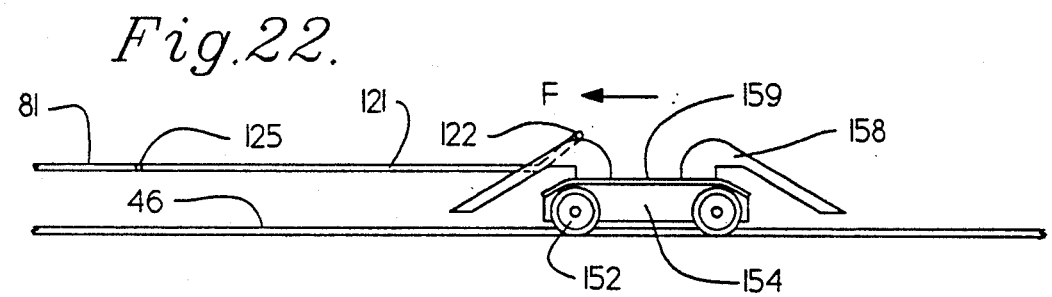
FIG. 22 is a side view of the two-wheeled dolly as it contacts the hinged switching rail of the present invention.
Figure 23:
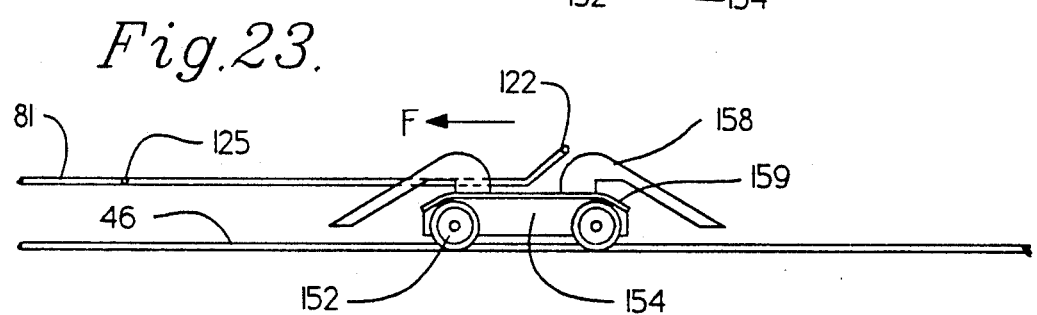
FIG. 23 is a side view of the two-wheeled dolly of the present invention as it passes under the hinged switching rail.
Figure 24:
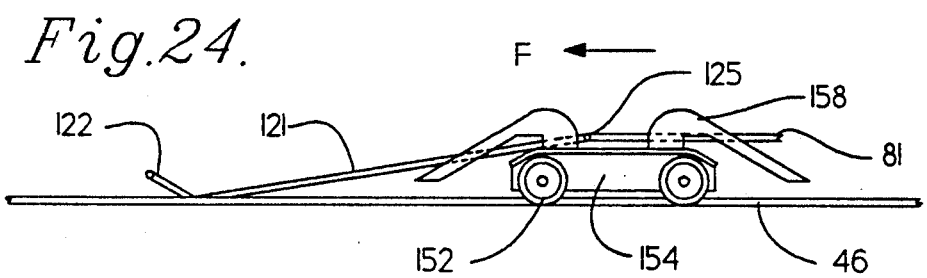
FIG. 24 is a side view of the two-wheeled dolly as it approaches the hinged switching rail in a direction opposite to that depicted in FIGS. 20-23.
Figure 25:
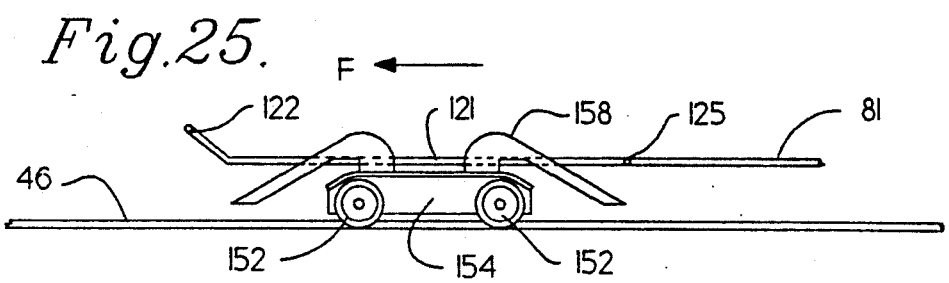
FIG. 25 is a side view of the two-wheeled dolly as it passes under the hinged switching rail moving in the direction depicted in FIG. 24.

An understanding of the operation of the cams 158 and 159 can be gleaned from FIGS. 20-25. For example, as shown in FIGS. 20 and 21, as the dolly 130 progresses toward the conveyor 22 in the direction generally designated as "F", it will encounter the hinged guide rail 121 which are normally in the down position. As shown in FIGS. 22 and 23, further progression of the dolly 150 in the "F" direction causes the cam member 158 to contact the actuator arm 122 and thereby lift the hinged guide rail 121 above the second cam member 159. As such, the dolly 150 remains on the continuous guide rail 70 as it continues to progress in the "F" direction. Finally, when the dolly 150 has progressed along the continuous guide rail 170 to a point where it will contact the second hinged guide rail 121 mounted along the conveyor 22, the first cam member 158, as shown in FIGS. 24 and 25, will lift the hinged guide rail 121 above the track wheels 152 thereby enabling the dolly 150 to proceed along the guide rail 46 mounted on the conveyor 22. As most specifically shown in FIG. 2, a wheel member 144, adapted to run along the mine floor is pivotally attached to a laterally extending frame member 18 of the mobile articulated conveyor 14 to provide additional support for the discharge end 15 of the mobile articulated conveyor 14. It will be appreciated, therefore, that the four-wheeled dolly 130 provides a symmetrical support system for the bridge conveyor discharge end.

As such, the present invention described hereinabove provides the mobile articulated conveyor with additional maneuverability to develop the necessary roadways and clearance generally needed to expand the network of stationary conveyors without the need of a second mining machine. In addition, because the bridge conveyor is symmetrically supported along the collection of stationary conveyors, a lighter and less expensive bridge conveyor frame and connection joint may be utilized. It will be understood, however, that various changes in the details, materials and arrangements of parts which have been herein described and illustrated in order to explain the nature of the invention, may be made by those skilled in the art within the principle and scope of the invention as expressed in the appended claims.

What is claimed is:

1. An apparatus for receiving and conveying material from a first movable conveyor having a movable support member pivotally attached to the discharge end thereof and an extended conveyor section pivotally attached to said discharge end, to second and third angularly intersecting conveyors comprising:
   conveying means operatively disposed between the second and third conveyors, said conveying means being adapted to receive material from the extended conveyor section of the first conveyor and discharge the material onto the third conveyor;
   means for guiding the movable support in a first predetermined path at a first predetermined height adjacent to the conveying means and for guiding said extended conveyor section in a second predetermined arcuate path at a second predetermined height above the conveying means for continuous discharge of the material thereupon; and
   elevation selection means attached to the movable support, said elevation selection means being adapted to cooperate with said guiding means for selectively switching between the first and second predetermined paths.

2. The apparatus recited in claim 1, wherein said guiding means comprises:
   a plurality of interconnected guide rails fastened to the second and third conveyors and said portable conveying means; and
   means for movably supporting said movable support and the extended conveyor section on said plurality of guide rails.

3. The apparatus as recited in claim 2 wherein said means for movably supporting comprises a first dolly pivotally attached to the discharge end of the extended conveyor section of the first conveyor, said first dolly having wheel means adapted to ride upon said guide rails.

4. The apparatus as recited in claim 3 wherein said movable support comprises a second dolly pivotally attached to the discharge end of the first conveyor, said second dolly having wheeled means adapted to ride upon said guide rails.

5. The apparatus recited in claim 4 wherein said guide rails comprise:
   first and second guide rails attached to the second and third conveyors and being adapted to guide the movable support along the second and third conveyors at said first predetermined height;
   third and fourth guide rails attached to said auxiliary conveying means, said third and fourth guide rails being adapted to guide the extended section of the first conveyor in said predetermined arcuate path above said auxiliary conveying means at said second predetermined height; and
   a plurality of primary transition guide rails attached to said third guide rail, said primary transition guide rails communicating with said first guide rails; and
   a plurality of secondary transition guide rails attached to said fourth guide rails and being adapted to selectively communicate with said second guide rails in response to said elevation selection means.

6. The apparatus as recited in claim 5 wherein said secondary transition guide rails are hingably connected to said fourth guide rail to thereby enable said secondary transition rails to pivotally communicate with said second guide rail.

7. The apparatus as recited in claim 6 wherein said wheeled means on said first dolly is adapted to ride upon said first and second guide rails and upon encountering said primary transition guide rails and said hinged secondary guide rails to ride thereupon onto said third and fourth guide rails to guide the extended section of the first conveyor in said first predetermined path above said portable conveying means and wherein said wheel means on said second dolly is adapted to ride on said second guide rail to guide the discharge end of the first conveyor in said path adjacent to the second and third conveyors and said portable conveying means.

8. The apparatus as recited in claim 7 wherein said elevation selection means comprises at least one actuator mechanism rigidly attached to said second dolly, said actuator being adapted to lift said hinged secondary transition guides above said wheeled means on said second dolly to thereby enable said second dolly to remain on said second guide rail.

9. The apparatus as recited in claim 8 wherein said actuator comprises a forward extending first cam shaped member that is adapted to engage an outwardly extending actuator arm rigidly fastened to said hinged secondary transition guide rails so that contact between said first cam shaped member and said actuator arm causes said hinged secondary transition guide to pivot above said wheeled means on said second dolly to thereby enable said second dolly to traverse thereunder and remain on said second guide rail.

10. The apparatus as recited in claim 9 wherein said actuator further comprises a second cam member mounted directly above said wheeled means on said second dolly to thereby receive and carry said hinged secondary transition guide above said wheeled means as said hinged secondary transition guide is pivotally displaced by said first cam shaped member.

11. The apparatus as recited in claim 10 wherein said auxiliary conveying means comprises a frame having a driven endless belt operably attached thereto, said frame being disposed between the first and second conveyors so that a first portion of said endless belt extends under a portion of the second conveyor and a second portion of said endless belt extends over the third conveyor to thereby enable said endless belt to receive material from the first conveyor and discharge the material onto the third conveyor.

12. The apparatus of claim 11 wherein said transition guide rails comprise a plurality of interconnected rail sections.

13. The apparatus of claim 12 additionally comprising deflection skirting removably fastened to said frame of said auxiliary conveying means, said deflection skirting being strategically positioned to deflect the conveyed material onto the endless belt of said auxiliary conveying means as the discharge end of the first conveyor is guided in an arcuate path above said auxiliary conveying means.

14. The apparatus of claim 13 wherein the portion of said transition guide rails attached to said fourth guide rail are arcuate and flat and define a short radius turn.

15. The apparatus of claim 14 wherein said wheeled means of said first dolly comprises:
a pair of first wheels rotatably mounted to said first dolly, said first wheels having a perimetrical groove therein adapted to receive said first, third and transition guide rails therein; and
a pair of second wheels rotatably mounted to said first dolly opposite to said first wheels, said second wheels having a shallow perimetrical groove therein, said shallow perimetrical groove enabling said second wheels to ride upon said second and fourth guide rails and enabling said second wheels to skid upon said flat and arcuate portion of said transition guides attached to said fourth guide rail.

* * * * *

UNITED STATES PATENT AND TRADEMARK OFFICE
CERTIFICATE OF CORRECTION

PATENT NO. : 5,161,670
DATED : November 10, 1992
INVENTOR(S) : Joseph S. David

It is certified that error appears in the above-identified patent and that said Letters Patent is hereby corrected as shown below:

Col. 9, line 18, delete "!3" and substitute therefore --13--.

Col. 9, line 41, delete "!5" and substitute therefore --15--.

Signed and Sealed this

Twenty-sixth Day of October, 1993

Attest:

BRUCE LEHMAN

*Attesting Officer*    *Commissioner of Patents and Trademarks*